(12) United States Patent
Hjelm et al.

(10) Patent No.: US 11,089,800 B2
(45) Date of Patent: Aug. 17, 2021

(54) ANIMAL FEED ADDITIVE EFFECTIVE AS BROAD-SPECTRUM PRESERVATIVE

(71) Applicant: PERSTORP AB, Perstorp (SE)

(72) Inventors: Hugo Hjelm, Hörby (SE); Jenny Björck, Klippan (SE); Lena Rosqvist, Ljungbyhed (SE)

(73) Assignee: PERSTORP AB, Perstorp (SE)

( * ) Notice: Subject to any disclaimer, the term of this patent is extended or adjusted under 35 U.S.C. 154(b) by 177 days.

(21) Appl. No.: 16/301,051

(22) PCT Filed: May 19, 2017

(86) PCT No.: PCT/SE2017/050531
§ 371 (c)(1),
(2) Date: Nov. 13, 2018

(87) PCT Pub. No.: WO2017/200479
PCT Pub. Date: Nov. 23, 2017

(65) Prior Publication Data
US 2019/0183144 A1   Jun. 20, 2019

(30) Foreign Application Priority Data

May 20, 2016   (SE) .................................... 1630112-9

(51) Int. Cl.
| | | |
|---|---|---|
| *A23K 20/105* | (2016.01) | |
| *A23K 30/00* | (2016.01) | |
| *A23K 20/158* | (2016.01) | |
| *A23B 9/26* | (2006.01) | |
| *A23K 20/10* | (2016.01) | |
| *A23K 20/22* | (2016.01) | |

(52) U.S. Cl.
CPC .............. *A23K 20/105* (2016.05); *A23B 9/26* (2013.01); *A23K 20/10* (2016.05); *A23K 20/158* (2016.05); *A23K 20/22* (2016.05); *A23K 30/00* (2016.05)

(58) Field of Classification Search
CPC ........ A23K 10/00; A23K 20/10; A23K 20/22; A23K 20/105; A23K 30/00; A23K 20/158; A23B 9/26; A61K 31/22; A61K 31/225; A61K 31/20; A61K 31/19
See application file for complete search history.

(56) References Cited

U.S. PATENT DOCUMENTS

| | | |
|---|---|---|
| 2,005,371 A | 6/1935 | Hull |
| 3,394,009 A | 7/1968 | Knightly et al. |
| 3,658,548 A | 4/1972 | Haas |
| 4,298,624 A | 11/1981 | Mehring et al. |
| 6,183,794 B1 | 2/2001 | Kaesler et al. |
| 2011/0038996 A1 | 2/2011 | De Lima Portilho |
| 2014/0323572 A1 | 10/2014 | Pimentel et al. |
| 2016/0213029 A1* | 7/2016 | Bruggeman ......... A23K 20/105 |

FOREIGN PATENT DOCUMENTS

| | | |
|---|---|---|
| GB | 1481961 A | 8/1977 |
| WO | 2012161633 A1 | 11/2012 |

OTHER PUBLICATIONS

International Search Report and Written Opinion dated Aug. 28, 2017 for corresponding PCT Application No. PCT/SE2017/050531.
Lacey, J. et al., "Chemicals for preventing moulding in damp hay," Animal Feed Science and Technology, vol. 6, 1981, pp. 323-336.

* cited by examiner

*Primary Examiner* — Hong T Yoo
(74) *Attorney, Agent, or Firm* — Polsinelli PC

(57) ABSTRACT

The present invention refers to an animal feed additive effective as broad-spectrum preservative, said feed additive comprises as active ingredients propionic acid, glyceryl propionates, hexanoic acid and optionally minor amounts of an alkali metal salt and/or a C7-C12 fatty acid. The present invention also refers to the use of said animal feed additive as a mould and/or yeast inhibitor and to the use of said animal feed additive as an inhibitor of aerobic bacteria. In a further aspect, the present invention refers to the use of said animal feed additive to protect an animal feed from aerobic deterioration.

19 Claims, 9 Drawing Sheets

US 11,089,800 B2

ANIMAL FEED ADDITIVE EFFECTIVE AS BROAD-SPECTRUM PRESERVATIVE

CROSS-REFERENCE TO RELATED APPLICATIONS

This application is a national stage application (under 35 U.S.C. § 371) of PCT/SE2017/050531, filed May 19, 2017, which claims benefit of Swedish Application No. 1630112-9, filed May 20, 2016, which are incorporated herein by reference in their entireties.

FIELD OF THE INVENTION

The present invention refers to an animal feed additive effective as broad-spectrum preservative, said animal feed additive comprises as active ingredients propionic acid, glyceryl propionates, hexanoic acid and optionally minor amounts of an alkali metal salt and/or a medium chain fatty acid of chain length C7-C12.

The present invention also refers to the use of said animal feed additive as a mould and/or yeast inhibitor and to the use of said animal feed additive as an inhibitor of aerobic bacteria.

In a further aspect, the present invention refers to the use of said animal feed additive to protect an animal feed from aerobic deterioration.

BACKGROUND OF THE INVENTION

Feed preservation is the process of treating and handling feed to stop or greatly slow down spoilage caused by micro-organisms. Micro-organisms like moulds, bacteria and yeast can be toxin-producing and infectious to both animals and humans. Their proliferation in feedstuffs also leads to losses in the nutritive value or palatability of the feed. Health and well-being both for animals and humans as well as economic reasons has driven the development of methods for inhibition of these harmful organisms.

Preservation involves preventing the growth of bacteria, mold and yeast. Common methods for feed preservation include drying (grain, hay), anaerobic storage (silage) and adding chemical preservatives (grain, wet by-products, silages with low or high dry matter content, etc.).

Propionic acid is today widely used as an effective and well proven preservative in animal feedstuffs. However, there are certain problems associated with the use of propionic acid. Since it is corrosive to skin and metals and has a flash point of less than 55° C., it is classified to be labelled as corrosive and flammable, thus limiting the possibility for end-users to store and transport the material. Swedish patent no. SE535688 presents a solution to this problem, since it discloses an animal feed additive based on a mixture of glyceryl propionates and propionic acid. This mixture does not have the negative properties associated with pure propionic aid, making said classification redundant, while preserving properties, such as mould inhibition, are essentially the same as for pure propionic acid.

Although mould growth in the feed is proven to be efficiently inhibited by the feed additive disclosed in Swedish patent no. SE535688, later studies have revealed a new composition that shows improved, broad-spectrum preservative properties on animal feeds. The present invention has revealed a composition comprising glyceryl propionates, propionic acid and hexanoic acid. This composition has proven to be even more efficient than pure propionic acid when it comes to keeping down the overall aerobic microbial activity in animal feed. Additionally, the composition disclosed in the present invention has proven to be as effective as the mixture of glyceryl propionates and propionic acid disclosed in SE535688 in long-term mould inhibition, and even slightly more efficient than said composition when it comes to preventing early moulding.

DETAILED DESCRIPTION OF THE INVENTION

Figure 1:
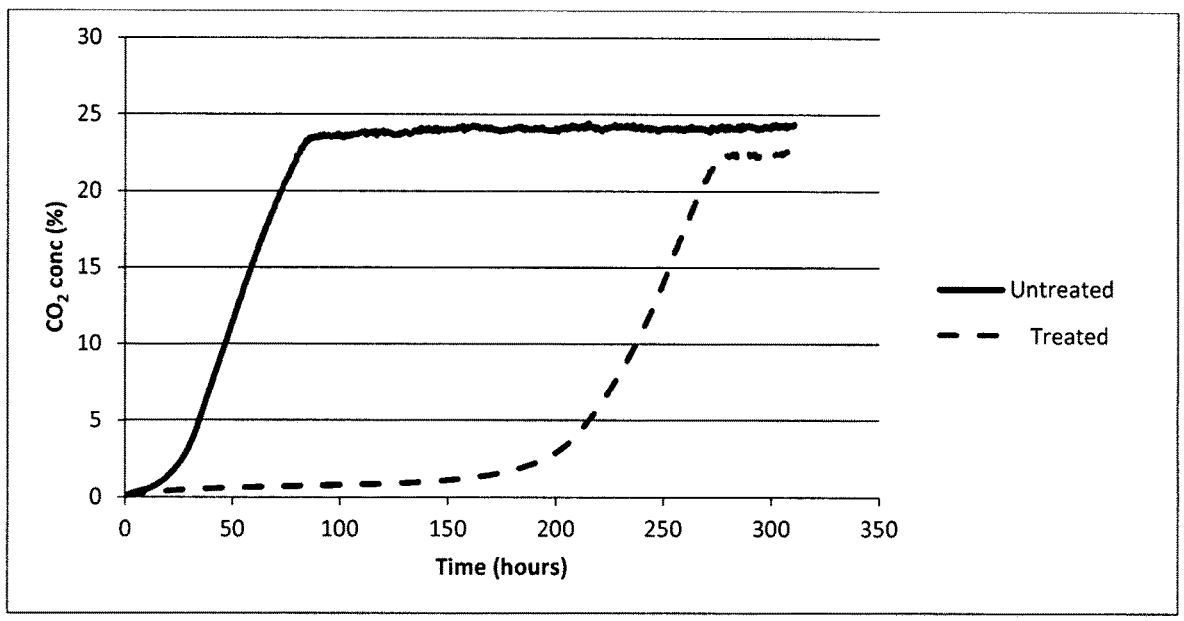
FIG. 1 illustrates a typical experiment measuring carbon dioxide levels in two feed samples: treated with a preservative and untreated.

Different kinds of feed often require different kinds of feed preservation; a method that is useful when preserving hay may not be very useful when preserving for example legumes. Due to the different micro environments in different feeds (water content, pH, availability of nutrients etc.), there is a natural variation in the microbial flora between different kinds of feed. The microbial flora in particular feeds may also vary during the season.

The present invention refers to an animal feed additive effective as broad-spectrum preservative. "Broad-spectrum preservative" is to be understood as a preservative protecting feed from spoilage caused by different kinds of microorganisms, such as different kinds of yeasts, moulds and bacteria. By being effective as a broad-spectrum preservative, the animal feed additive according to the present invention can provide a preservative that is effective in different kinds of feed and over the whole season.

Said animal feed additive comprises 15-80% by weight of propionic acid, 10-70% by weight of glyceryl propionates, 5-40% by weight of hexanoic acid, balance to 100% by weight being water.

According to a preferred embodiment of the present invention, the animal feed additive comprises 8-25% by weight of hexanoic acid.

According to a still more preferred embodiment of the present invention, the animal feed additive comprises 10-20% by weight of hexanoic acid.

The preferred concentration-intervals of hexanoic acid stated above considers both having the best preservative effect of the animal feed additive according to the present invention, but also keeping the cost of the animal feed additive at an acceptable level. Since the price of hexanoic acid is higher than the price of propionic acid, it is preferable not to add more hexanoic acid than necessary.

However, in cases where cost is not an important consideration, the animal feed additive according to the present invention preferably comprises 15-30% by weight, or even 20-35% by weight of hexanoic acid.

The glycerol content in the animal feed additive according to the present invention is typically rather low, preferably less than 4% by weight. Optionally, the animal feed additive comprises 0.5-5% by weight of an alkali metal salt, preferably a formate, such as potassium or sodium formate. Said animal feed additive may also optionally comprise 0.5-10% by weight of another medium chain fatty acid of chain length C7-C12; preferably said optional medium chain fatty acid is octanoic acid.

The animal feed additive is balanced to 100% by weight with water, such as reaction water and water emanating from the water content of the used raw materials.

Said glyceryl propionates are present as a mixture of mono-, di- and tripropionates in a ratio of 30-50% by weight of glyceryl monopropionate, 40-60% by weight of glyceryl dipropionate and 5-20% by weight of glyceryl tripropionate, balance being 100% by weight.

Aerobic deterioration of the feed is a problem both in TMR (Total mixed ration) and also in silage, after opening of the silo. Yeasts are the organisms that primarily initiate aerobic deterioration in feeds. Carbon dioxide produced by yeast fermentation leads to a net loss of dry matter and a corresponding reduction in nutritive value. This will also decrease the palatability of the feed, causing a reduced feed intake. Yeasts and acetic acid bacteria, which are capable of rapid growth in the presence of oxygen, are considered the primary initiators of aerobic spoilage.

Aerobic respiration produces carbon dioxide and therefore, aerobic microbial activity in a feed sample can be measured experimentally by measuring the concentration of carbon dioxide. The overall aerobic microbial activity can be easily visualized in a graph showing how the carbon dioxide concentration varies with time in a sample. The quicker the $CO_2$-level rises in a sample, the faster is the evolution of aerobic microorganisms in the sample and the greater is the risk that the feed is deteriorated by microorganisms. FIG. 1 below illustrates a typical experiment measuring carbon dioxide levels in two feed samples: treated with a preservative and untreated.

As can be seen in FIG. 1, the $CO_2$-level rises much faster in the untreated sample than in the treated, indicating a faster increase of aerobic microbial activity.

The animal feed additive according to the present invention is effective both as a mould inhibitor, as a yeast inhibitor and as an inhibitor of aerobic bacteria, and it thereby has a broader protection scope compared to many of the preservatives used today.

In one embodiment the present invention refers to the use of said animal feed additive as a mould- and/or yeast inhibitor.

In another embodiment, the present invention refers to the use of said animal feed additive as an inhibitor of lactate assimilating yeast.

The present invention also refers to the use of said animal feed additive as an inhibitor of aerobic bacteria and in particular of acetic acid bacteria.

In a further perspective, the present invention refers to the use of said animal feed additive to protect an animal feed from aerobic deterioration.

Mould and yeast growth is a common problem especially in processed feeds like grains, legumes, oilseeds and/or food byproducts, which are feedstuffs with relatively high water content. These kinds of feeds are especially well preserved against aerobic deterioration, yeasts, moulds and bacteria with the feed additive according to the present invention. However, also unprocessed feeds are well preserved with the animal feed additive according to the present invention.

Typically, the animal feed additive according to the present invention is added to the feed at a concentration of between 0.01 to 2.0% by weight.

The present invention is illustrated in the below Embodiment Examples, which are to be construed as merely illustrative and not limiting in any way.

EMBODIMENT EXAMPLES

Example 1: Aerobic Microbial Activity in Whole Ground Wheat Treated with Different Feed Additives Samples of 100 g whole grain milled wheat, with a water content of 18% by weight, were treated at a dosage of 0.05% by weight with different feed additives according to Table 1 below.

TABLE 1

| Sample | Feed additive |
|---|---|
| 1 | Untreated control |
| 2 | Propionic acid |
| 3 | ProSid ™ MI 700 |
| 4 | Hexanoic acid |
| 5 | ProSid ™ MI 700 + 20% hexanoic acid |
| 6 | ProSid ™ MI 700 + 30% hexanoic acid |

ProSid™ MI 700 is a commercial feed additive from Perstorp AB, comprising 60-70% propionic acid and 20-30% glycerol propionates (glyceryl mono-, di- and tripropionates).

The treated wheat samples were each put in a 1 liter shake flask equipped with a carbon dioxide sensor. All treatments were prepared in three replicates. During a period of 287 hours the individual carbon dioxide levels were measured every 30 minutes. The obtained carbon dioxide levels are a straight receipt of aerobic microbial activity, and in particular of yeast activity.

Figure 2:
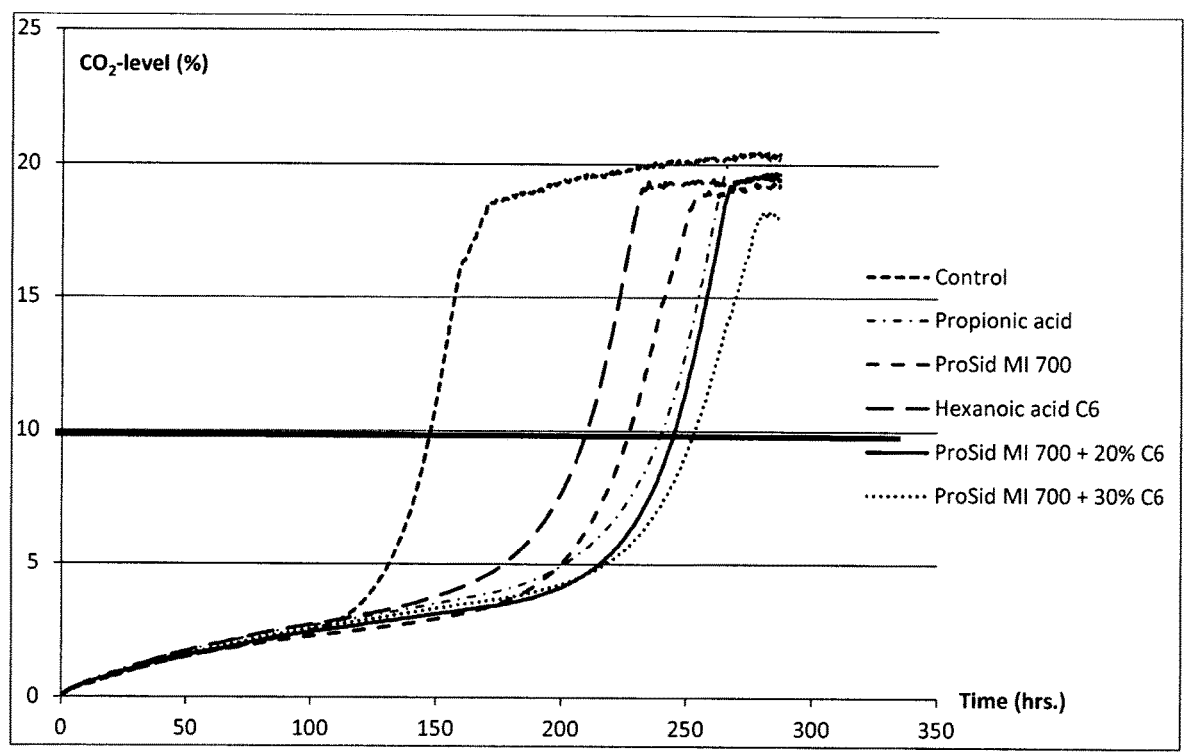
FIG. 2 illustrates carbon dioxide levels over time for wheat treated with various additives.

The carbon dioxide levels during the experiment are in FIG. 2.

Analysis of the Time Required to Reach a 10% Carbon Dioxide Level in Example 1

The time required to reach a carbon dioxide level of 10% was noted for each replicate and a mean value was calculated for each of the samples 1-6. The 10% carbon dioxide level is marked in FIG. 1 and the mean values of the time to reach this $CO_2$-level are shown in FIG. 3 below.

Figure 3:
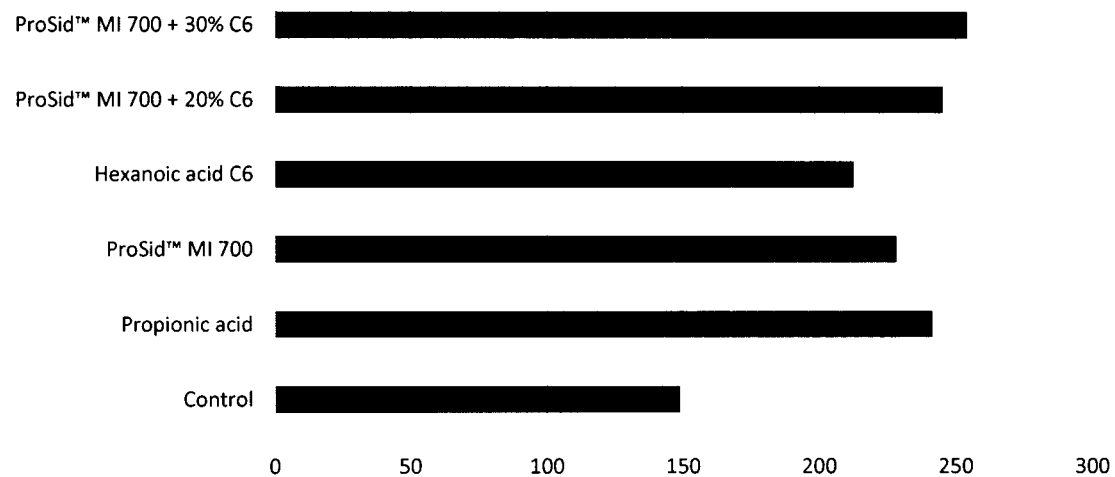
FIG. 3 is a graph showing time required to reach a 10% carbon dioxide level for wheat treated with various additives.
Figure 4:
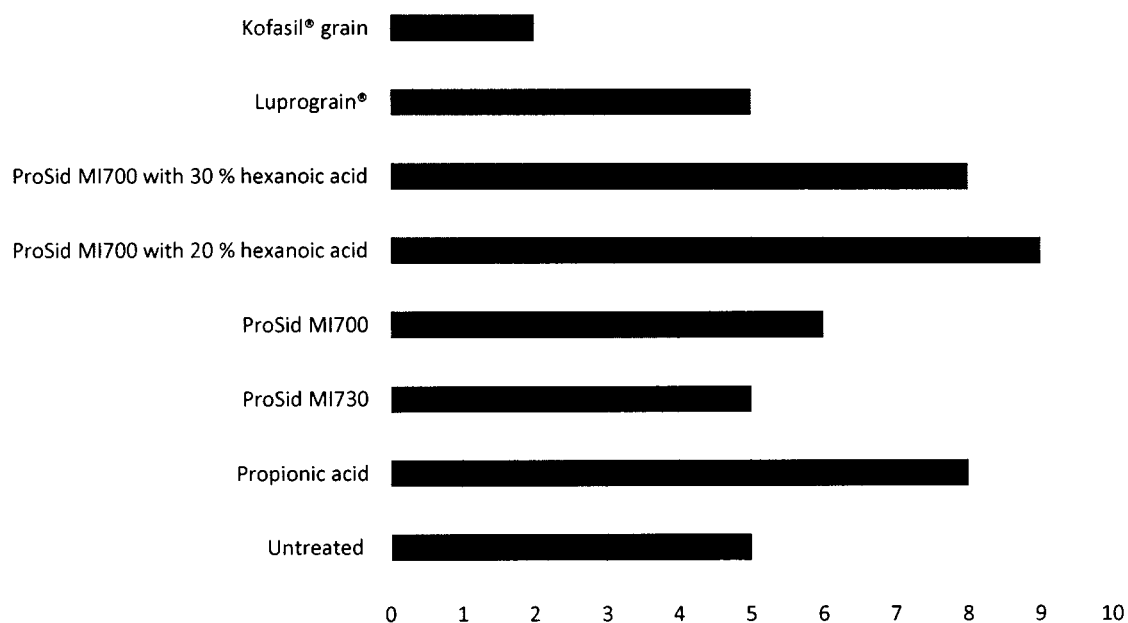
FIG. 4 is a graph showing time (weeks) for wheat treated with low doses of various additives to reach a mold score 1.
Figure 5:
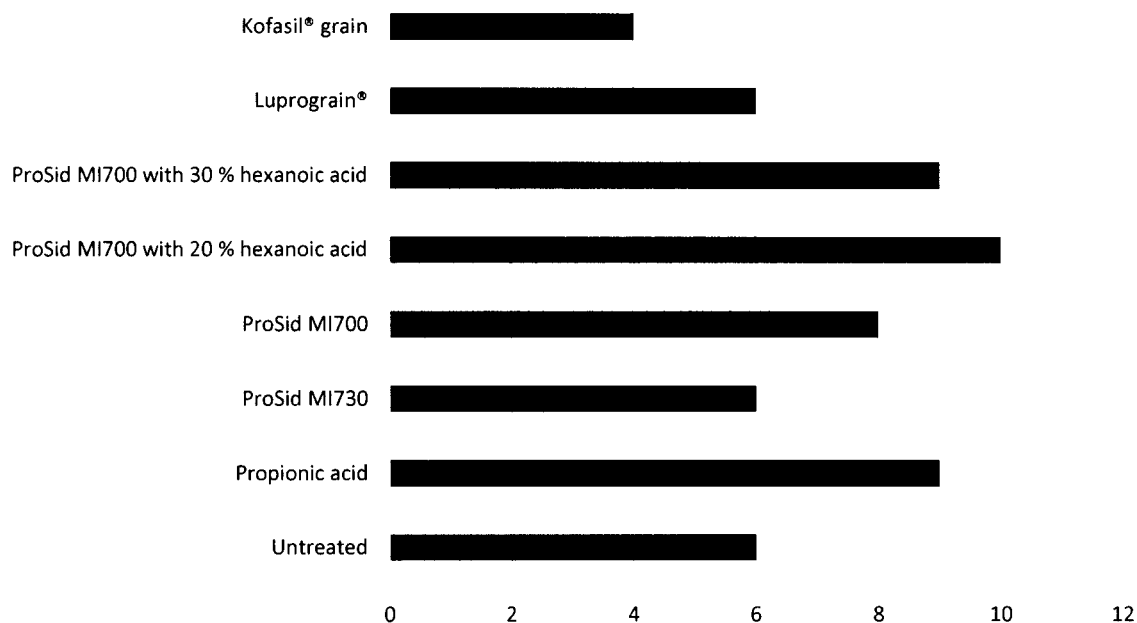
FIG. 5 is a graph showing time (weeks) for wheat treated with low doses of various additives to reach a mold score 2.
Figure 6:
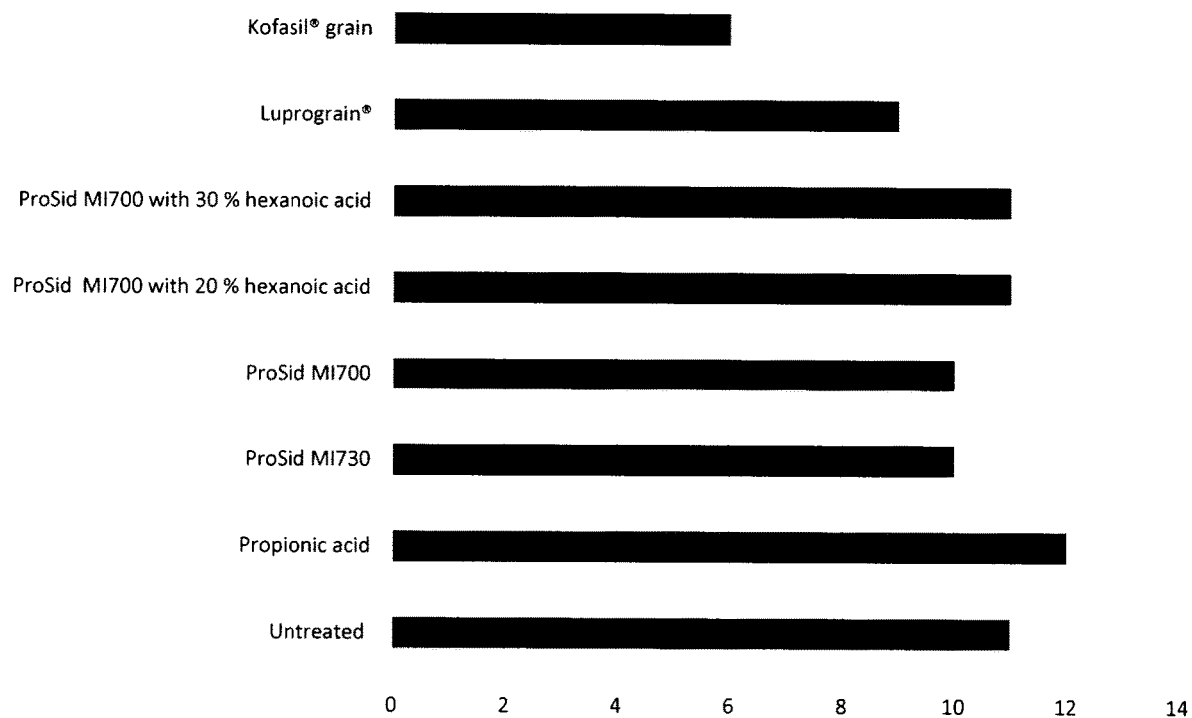
FIG. 6 is a graph showing time (weeks) for wheat treated with low doses of various additives to reach a mold score 5.
Figure 7:
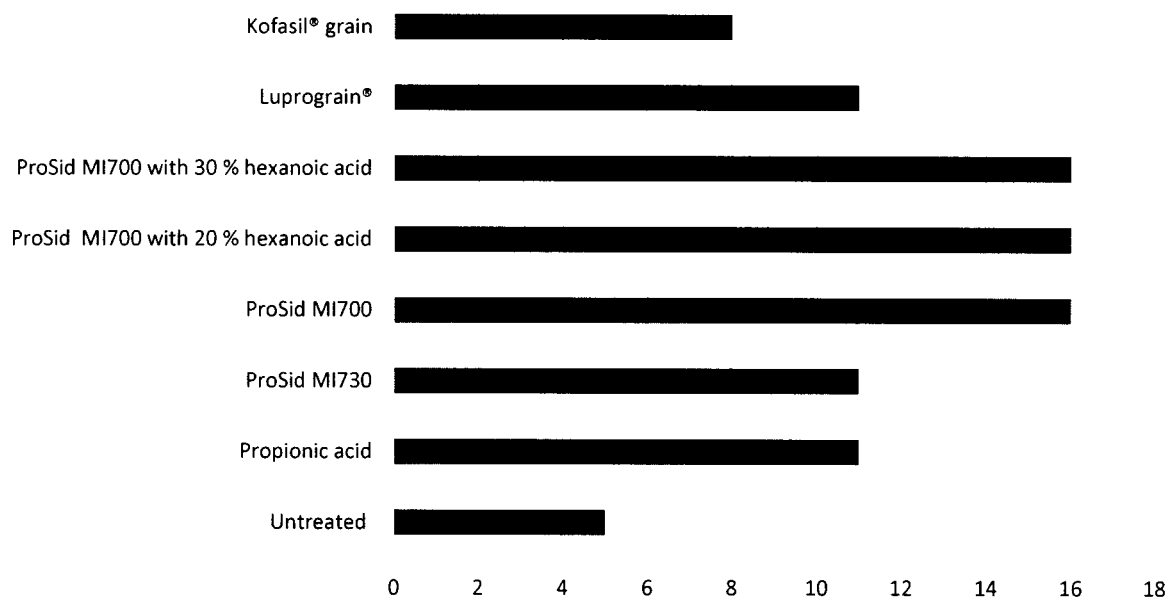
FIG. 7 is a graph showing time (weeks) for wheat treated with high doses of various additives to reach a mold score 1.
Figure 8:
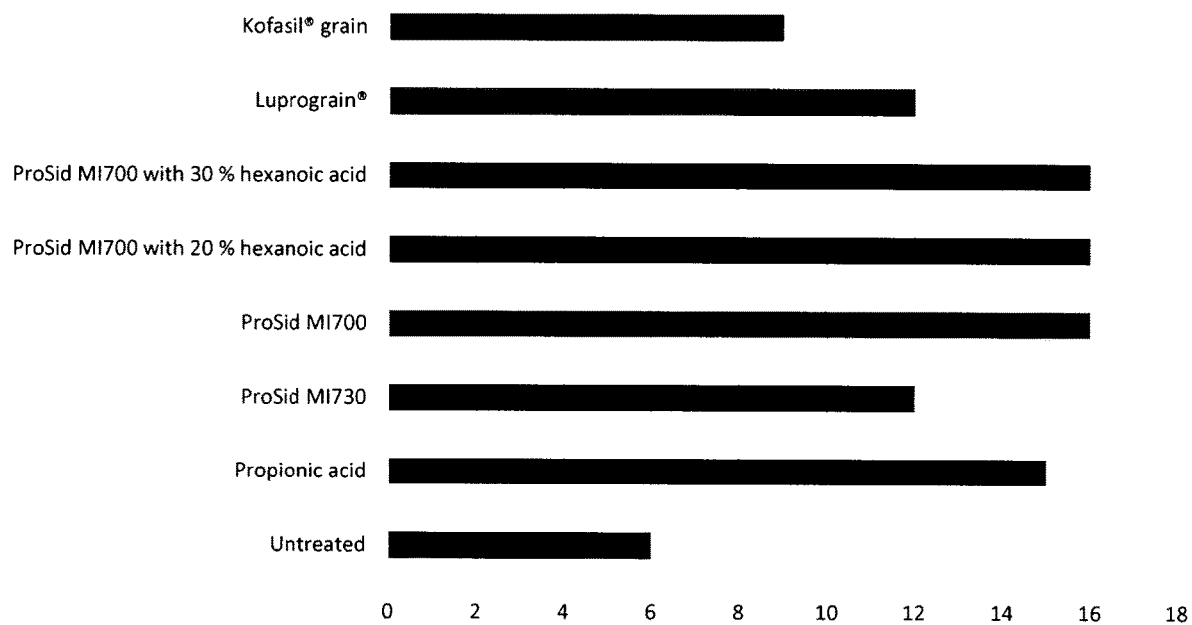
FIG. 8 is a graph showing time (weeks) for wheat treated with high doses of various additives to reach a mold score 2.
Figure 9:
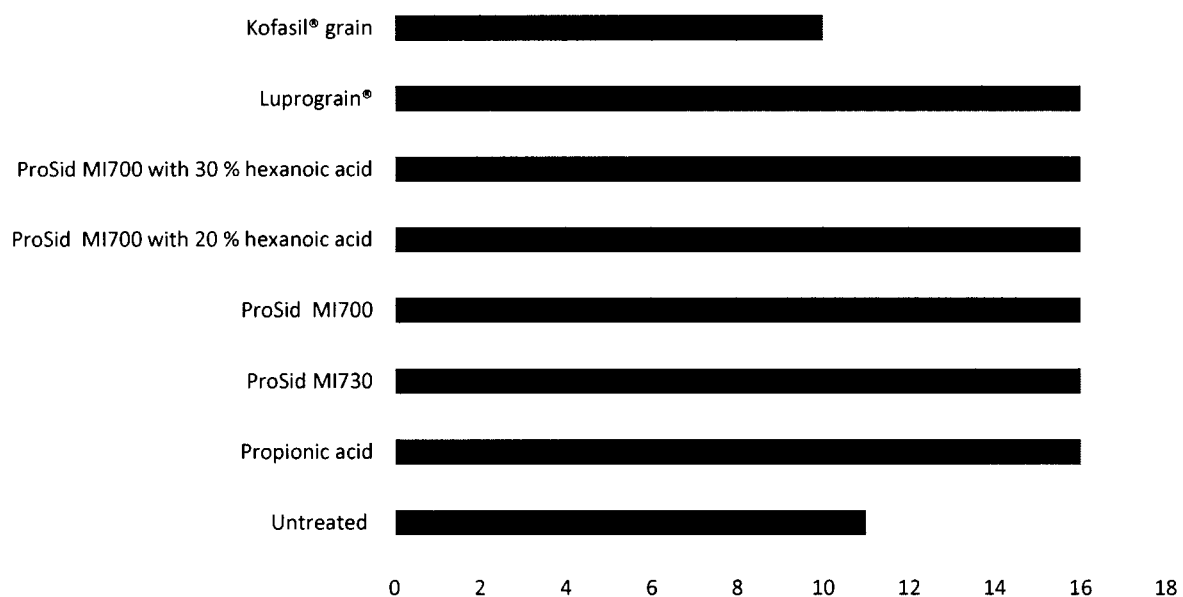
FIG. 9 is a graph showing time (weeks) for wheat treated with high doses of various additives to reach a mold score 5.

As can be seen both in FIG. 2 and in FIG. 3, the evolution of carbon dioxide is slowest in the samples treated with the animal feed additive according to the present invention. Comparing the curves in FIG. 2, it is clear that the feed additive according to the present invention (ProSid™ MI 700+20% hexanoic acid and ProSid™ MI 700+30% hexanoic acid) performs better than what could be expected from looking at the individual curves for ProSid™ MI 700 and hexanoic acid respectively. The components of the feed additive according to the present invention acts together in a synergistic way, resulting in an unexpectedly high preservative effect.

Example 2: Long-Term Mould Inhibition in Barley Kernels Treated with Different Feed Additives Samples of 450 g barley kernels, with a water content of 23% by weight, were treated with different feed additives according to Table 2 below. The treatments were conducted at a low dosage of 2.85 ml/kg (corresponding to about 0.3% by weight) and at a high dosage of 5.7 ml/kg (corresponding to about 0.6% by weight) for each additive. Treated grains were filled in glass jars with 450 g/jar, in three replicates (three glass jars per treatment and dosage respectively). An untreated control was also run in triplicate. All jars were stored in a temperature controlled room at 20±2° C.

TABLE 2

| Sample | Feed additive |
|---|---|
| 1 | Untreated |
| 2 | Propionic acid |
| 3 | ProSid ™ MI730 |
| 4 | ProSid ™ MI700 |
| 5 | ProSid ™ MI700 with 20 % m/m hexanoic acid |
| 6 | ProSid ™ MI700 with 30 % m/m hexanoic acid |
| 7 | Luprograin ® |
| 8 | Kofasil ® grain |

ProSid™ MI 700 is a commercial feed additive from Perstorp AB, comprising 60-70% propionic acid and 20-30% glycerol propionates (glyceryl mono-, di- and tri-propionates).

ProSid™ MI 730 is a commercial feed additive from Perstorp AB, comprising 25-40% propionic acid and 45-60% glycerol propionates (glyceryl mono-, di- and tri-propionates).

Luprograin® is a commercial feed additive from BASF, comprising about 73% propionic acid, 21% ammonium propionate and 4% 1,2-propanediol.

Kofasil® grain is a commercial feed additive from Addcon comprising about 37% propionic acid, 13% sodium benzoate and 11% sodium propionate.

Mould growth in the jars was monitored by weekly visual inspection of the jars. The extent of mould growth was quantified with the help of a scoring system ranging from 0 to 5, according to Table 3 below.

TABLE 3

| Score | Visble mould occurrence |
|---|---|
| 0 | No mould |
| 1 | <2 small colonies |
| 2 | <10% of sample mouldy |
| 3 | 10-30% of sample mouldy |
| 4 | 30-50% of sample mouldy |
| 5 | >50% of sample mouldy |

Mould growth on the grain was monitored over a period of 16 weeks.

Results are presented as
a) Time until the grain starts to get mouldy (time from start until mould score 1, weeks)
b) Time from start until mould score 2 (weeks)
c) Time from start until mould score 5 (weeks)

The values of a), b) and c) for all samples treated at the low dosage and all samples treated at the high dosage respectively are shown in FIGS. 4-9. The values given in the figures are the lowest value among the three replicates for each sample respectively. These values illustrate the "worst case" for each triplicate, i.e. the earliest time when at least one of the three replicates has reached a specific mould score.

The results show that treatment with the low dosage only gave a short term preservation effect. However, regarding the early moulding (times until mould scores 1 and 2 respectively) ProSid™ M1700 with hexanoic acid performed best.

Treatment with the high dosage improved storage quality remarkably for all samples but Kofasil® grain. ProSid™ M1700 alone or together with hexanoic acid were outstanding, with no mould at all visible after 16 weeks, while all the other samples had reached at least mould score 2 after 16 weeks.

The invention claimed is:
1. An animal feed additive comprising:
15-80% by weight of propionic acid,
10-70% by weight of glyceryl propionates,
5-40% by weight of hexanoic acid,
water, and
provided that if the animal feed additive comprises one or more medium chain fatty acids of chain length C7-C12, the one or more medium chain fatty acids of chain length C7-C12 is/are in an amount of 0.5 to 10% by weight;
wherein the animal feed additive is a broad spectrum preservative.
2. The animal feed additive according to claim 1, wherein the hexanoic acid is in an amount of 10-20% by weight.
3. The animal feed additive according to claim 1, wherein the hexanoic acid is in an amount of 20-35% by weight.
4. The animal feed additive according to claim 1, further comprising glycerol, wherein the glycerol is in an amount of less than 4% by weight.
5. The animal feed additive according to claim 1, wherein the glyceryl propionates is a mixture consisting of:
30-50% by weight of glyceryl monopropionate,
40-60% by weight of glyceryl dipropionate, and
5-20% by weight of glyceryl tripropionate.
6. The animal feed additive according to claim 1, further comprising at least one alkali metal salt in an amount of 0.5-5% by weight.
7. The animal feed additive according to claim 6 wherein the alkali metal salt is potassium or sodium formate.
8. A method for inhibiting mold and/or yeast in animal feed comprising adding the animal feed additive according to claim 1 to the animal feed.
9. The method of claim 8, wherein the method inhibits lactate assimilating yeast.
10. The method of claim 8, wherein the animal feed is selected from processed grains, process legumes, processed oilseeds, and processed food byproducts.
11. The method of claim 8, wherein the animal feed is selected from grains, legumes, oilseeds, and food byproducts.
12. The method of claim 8, wherein the animal feed additive is added to the animal feed at a concentration of between 0.01 to 2.0% by weight.
13. A method for inhibiting aerobic bacteria in animal feed comprising adding the animal feed additive according to claim 1 to the animal feed.
14. The method of claim 13, wherein the method inhibits acetic acid bacteria.

15. The method of claim 13, wherein the animal feed additive is added to the animal feed at a concentration of between 0.01 to 2.0% by weight.

16. A method for protecting animal feed from aerobic deterioration comprising adding the animal feed additive of claim 1 to the animal feed.

17. The method of claim 16, wherein the animal feed additive is added to the animal feed at a concentration of between 0.01 to 2.0% by weight.

18. An animal feed additive consisting of:
15-80% by weight of propionic acid,
10-70% by weight of glyceryl propionates,
5-40% by weight of hexanoic acid,
water,
glycerol, in an amount of less than 4% by weight,
optionally, 0.5-5% by weight of at least one alkali metal, and
optionally, 0.5-10% by weight of at least one medium chain fatty acid of chain length C7-C12;
wherein the animal feed additive is a broad spectrum preservative.

19. A method for inhibiting mold and/or yeast in animal feed comprising adding the animal feed additive according to claim 18 to the animal feed.

* * * * *